United States Patent [19]

Adamek et al.

[11] Patent Number: 5,546,900
[45] Date of Patent: Aug. 20, 1996

[54] INTAKE ASSEMBLY FOR A MULTI-CYLINDER INTERNAL-COMBUSTION ENGINE

[75] Inventors: Peter Adamek, Stuttgart; Eduard Kopec, Bietigheim-Bissingen; Armin Ludmann, Gerlingen, all of Germany

[73] Assignee: Filterwerk Mann & Hummel GmbH, Ludwigsburg, Germany

[21] Appl. No.: 498,186

[22] Filed: Jul. 5, 1995

[30] Foreign Application Priority Data

Jul. 5, 1994 [DE] Germany ................. 44 23 427.9

[51] Int. Cl.⁶ ................. F02B 27/02; F02D 9/16
[52] U.S. Cl. ................. 123/184.55
[58] Field of Search ......... 123/184.55, 184.56, 123/184.53, 184.61

[56] References Cited

U.S. PATENT DOCUMENTS

| | | | |
|---|---|---|---|
| 4,643,138 | 2/1987 | Ruf et al. . | |
| 4,779,600 | 10/1988 | Asaga et al. . | |
| 4,862,840 | 9/1989 | Matsunaga et al. | 123/184.55 |
| 4,911,111 | 3/1990 | Matsnaga et al. | 123/184.55 |
| 4,932,369 | 6/1990 | Parr | 123/184.55 |
| 5,033,417 | 7/1991 | Van Basshuysen et al. | 123/184.55 |
| 5,156,117 | 10/1992 | Muller et al. | 123/184.55 |
| 5,492,088 | 2/1996 | Ohrnberger | 123/184.55 |

FOREIGN PATENT DOCUMENTS

| | | |
|---|---|---|
| 215628 | 3/1987 | European Pat. Off. . |
| 355960 | 2/1990 | European Pat. Off. . |
| 2682431 | 4/1993 | France . |
| 3807193 | 6/1989 | Germany . |
| 4018612 | 12/1991 | Germany . |
| 4040598 | 6/1992 | Germany . |
| WO94/04803 | 3/1994 | WIPO . |

*Primary Examiner*—Marguerite McMahon
*Attorney, Agent, or Firm*—Evenson, McKeown, Edwards & Lenahan

[57] ABSTRACT

An intake assembly for a multi-cylinder internal combustion engine which has at least first and second intake ducts of different lengths for each cylinder which proceed from an intake distributor and converge shortly before an intake valve. The shorter second intake duct is provided with a shut-off device formed by a control shaft which extends along the whole length of the laterally adjacent second individual intake ducts and at least one end of which is mounted in a radially freely movable manner.

10 Claims, 2 Drawing Sheets under a combustion-ar-shaft, penetrating all intake bly, is a so-called floating control shaft, which means that it is arranged in a radially freely movable manner in the corresponding opening of the intake assembly. This effectively prevents jamming or sticking of the control shaft.

INTAKE ASSEMBLY FOR A MULTI-CYLINDER INTERNAL-COMBUSTION ENGINE

BACKGROUND OF THE INVENTION

This invention relates to an intake assembly for a multi-cylinder internal-combustion engine comprising at least two intake ducts of different lengths for each cylinder which start out from an intake distributor and converge shortly before the intake valve, and in which a shut-off device is provided for the shorter intake duct.

An intake manifold assembly is known from Published German Patent Application No. DE 4,040,598. This assembly has first and second intake ducts of different lengths for each cylinder, which intake ducts each start out from a first or from a second intake distributor.

An intake duct comprising a throttle valve leads into the first intake distributor which is connected with the second intake distributor by means of a pipe.

In the second intake distributor, a rotary shield is arranged which has a wall curved in the shape of a graduated circle which interacts with a correspondingly curved wall of the intake distributor. By switching of the rotary shield, the second intake distributor can be activated or shut off.

In such a device, it is important to achieve a good seal between the individual intake ducts. This means that a very high accuracy of fit is required during the manufacturing of the individual elements. If the intake assembly is formed of plastic, the high accuracy of fit can be achieved only by means of relatively high manufacturing expenditures.

An intake manifold assembly of this type is also described in U.S. Pat. No. 4,643,138 (=EP 177,794). In this case, the individual intake ducts are combined with a collecting intake duct to form a unit to which the intake distributor is flanged as a separate component. This intake distributor is connected on one side with the collecting intake duct through a throttle valve and, on the other side, it is connected with the individual intake ducts. The two individual intake ducts may be shut-off or opened up by means of flaps which are arranged on shafts. The manufacturing of this known intake manifold assembly results in relatively high expenditures and presents problems with respect to a perfect interaction of the pivotable flaps disposed in the intake distributor with the second individual intake ducts arranged in another component.

SUMMARY OF THE INVENTION

It is the object of the invention to provide an intake assembly of the above-mentioned type which has an operationally reliable design and which can be manufactured at low cost.

These and other objects of the invention are achieved by providing an intake assembly for a multi-cylinder internal combustion engine comprising at least first and second intake ducts of different lengths for each cylinder which proceed from an intake distributor and converge shortly before an intake valve, wherein a shorter of the first and second intake ducts is provided with a shut-off device comprising a control shaft, the shorter intake ducts for each cylinder being arranged laterally adjacent each other, and wherein the control shaft has at least one end mounted in a radially freely movable manner and extends entirely across the laterally adjacent shorter intake ducts.

The principal advantage of the invention is the fact that the control shaft, which penetrates the whole intake assembly, is a so-called floating control shaft, which means that it is arranged in a radially freely movable manner in the corresponding opening of the intake assembly. This effectively prevents jamming or sticking of the control shaft.

One advantageous embodiment of the invention envisions use of an axially defined bearing, particularly a toe bearing or point bearing, for axially fixing the position of the control shaft. This toe bearing is arranged on the end face of the control shaft. On the opposite end of the control shaft, the shaft is supported by a pressure spring. In order to reduce the frictional forces of the toe bearing, it is advantageous to use a bearing plate made of teflon (i.e. polytetrafluoroethylene). Naturally, it is also possible to use other low-friction materials for this bearing.

According to another embodiment of the invention, a claw coupling is arranged on a face of the control shaft, for the tension-free transmission of a rotating movement. This claw coupling has a radial mobility. The rotary plate is therefore also uncoupled and transmits only the corresponding rotating movement.

In order to provide for proper sealing between the individual intake ducts, according to one embodiment of the invention the control shaft is provided, between openings into each two adjacent intake ducts, with a respective circumferential groove into which an outside-bracing sealing ring (similar to a piston ring) can be inserted. This sealing ring rests sealingly against the wall of the receiving bore for the control shaft. The insertion of the control shaft with the sealing rings may be effected by using a mounting sleeve, as is conventional during the mounting of pistons equipped with piston rings. On the one hand, by means of these sealing rings, a reliable sealing is achieved between the individual intake ducts. On the other hand, tolerances between the control shaft and the bore are effectively compensated.

The intake assembly preferably is formed of plastic (i.e. synthetic resin), and because of its complicated structure, particularly preferably comprises a plastic part which is manufactured by the molten-core method. The control shaft may be manufactured from a plastic injection-molded part.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawings in which.

DETAILED DESCRIPTION OF THE PREFERRED EMBODIMENTS

Figure 1:
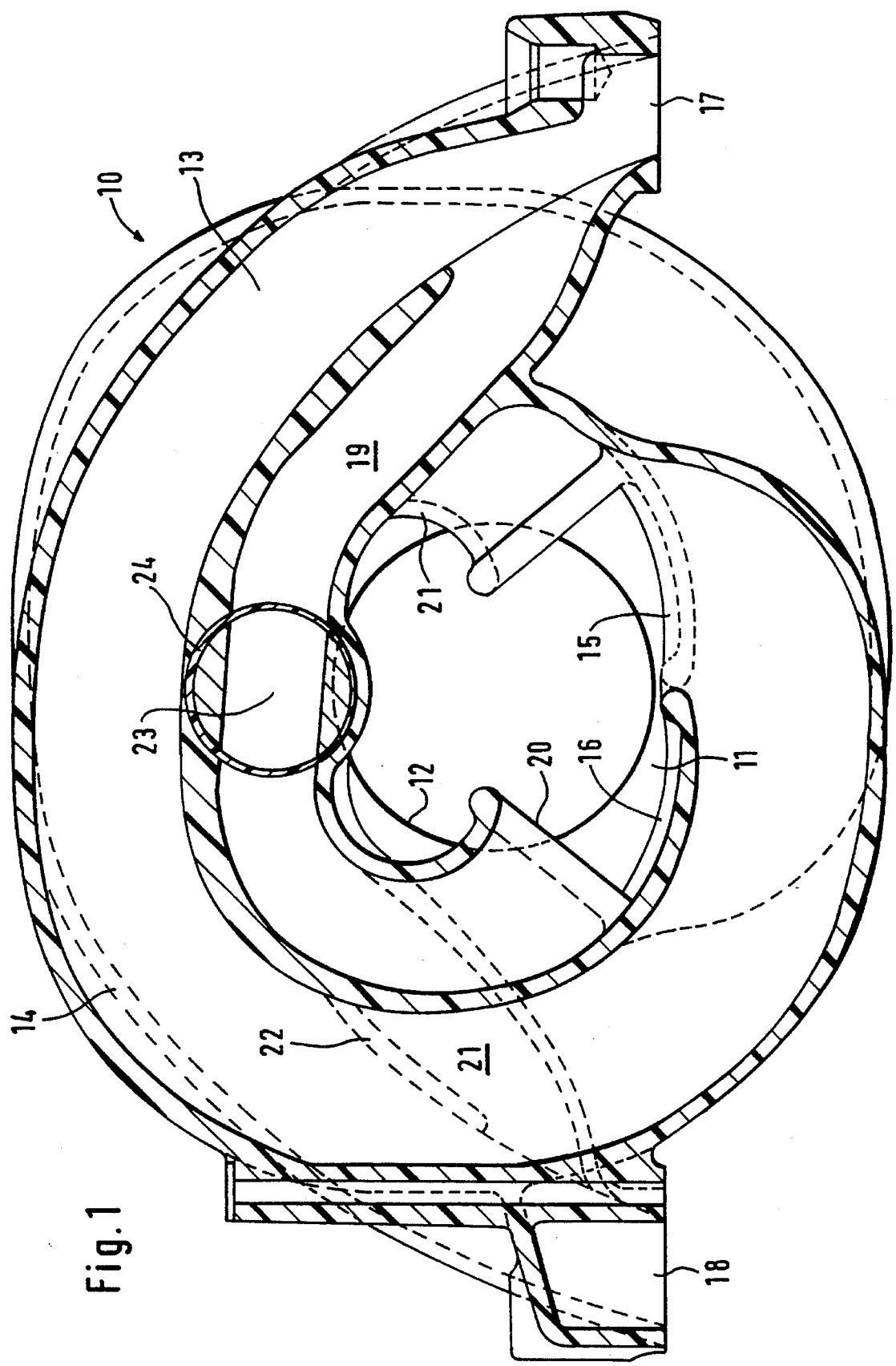
FIG. 1 is a cross-sectional view of an intake assembly.

The intake assembly illustrated in FIG. 1 is intended to be arranged between the cylinder banks of an internal combustion engine having a V-shaped construction. It comprises a one-piece plastic component 10 which is produced, for example, by means of the molten-core method. A central tube-shaped intake distributor 11 is contained in this plastic component 10 and is connected by an opening 12 in an exterior wall of the plastic component 10 with a throttle valve part which is not shown. First individual intake ducts 13 for the cylinders of the right cylinder bank and other individual intake ducts 14 (illustrated by broken lines) for the cylinders of the second cylinder bank arranged on the left side proceed in an alternating fashion from the intake distributor 11. The first,individual intake ducts 13 and 14 are arranged adjacent each other and, as illustrated in FIG. 1, extend around the intake distributor 11, with the first individual intake ducts 13 in FIG. 1 extending clockwise and the first individual intake ducts 14 extending counterclockwise. The inlet opening of the first individual intake ducts is arranged in area 15; the inlet opening of the second individual intake ducts is arranged in area 16. The individual intake ducts each end in a flange 17, 18 which is mounted on the cylinder head of the respective cylinder bank. The intake assembly is attached to the engine through the respective flanges by means of suitable screwed connections. Radially inside each first individual intake duct 13, a shorter second individual intake duct 19 is arranged which is also supplied by the intake distributor 11. The inlet opening 20 connects this individual intake duct with the intake distributor 11. The second individual intake ducts 21 extend parallel to, and in the same direction as, the associated first individual intake ducts and have a common wall 22 with them. In order to shut off or open up the shorter individual intake ducts 19, 21, a control shaft 23 is provided. This control shaft 23 is provided inside the plastic component disposed in an elongated bore 24 which intersects the second individual intake ducts 19, 21. In the illustrated position, the second individual intake ducts 19, 21 are opened up in addition to the first individual intake ducts 13, 14. When the engine is under full load, this position produced a higher torque below a defined rotational limit speed. The rotational limit speed may be, for example, 4,300 revolutions per minute. The control shaft 23 is rotated into the respective position by a control element which is not shown here.

Figure 2:
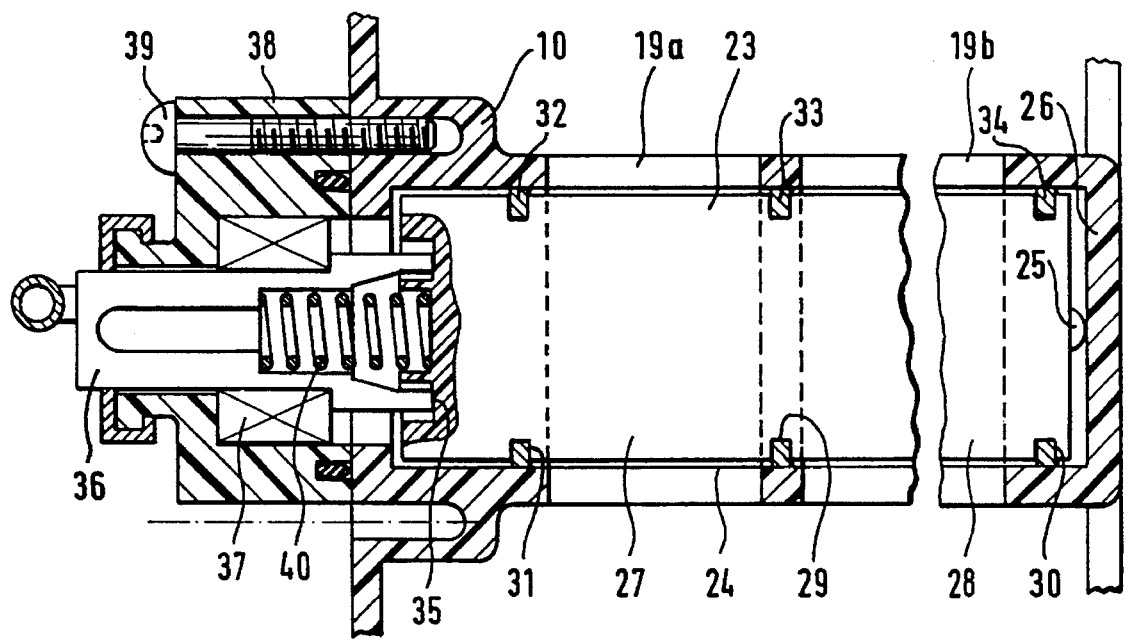
FIG. 2 is a sectional view of a control shaft arranged in the intake assembly.

FIG. 2 is a cross-sectional representation of the control shaft 23. The plastic component 10 of the intake assembly is shown here only as a cutout. The control shaft 23 is inserted into an elongated bore 24 of the plastic component. On the right-side end, the control shaft 23 is supported on the end wall 26 of the plastic component by means of a nub 25. In the illustrated position, the passage openings 27, 28 connect the parallel individual intake ducts 19a, 19b. Between the individual intake ducts, the control shaft 23 is provided with grooves 29, 30, 31. A sealing ring 32, 33, or 34 is disposed in each of these grooves, respectively. These sealing rings are constructed like piston rings and bear against the wall of the elongated bore 24. On the left end face, the control shaft 23 is attached to a coupling element 36 by of a claw coupling 35. The coupling element 36 is rotatably mounted by a ball bearing 37 on a connecting flange 38. As illustrated here, the connecting flange may be fastened directly to the plastic component 10 by screwed connections 39. The coupling element 36 is rotated by a control element, which is not shown here, in which case the rotational movement amounts to approximately 90°. This makes it possible to close the individual intake ducts 19a, 19b by means of the control shaft. A pressure spring 40, which is supported on one side by the coupling element 36 and on the other side by the control shaft, exerts an axial force on the control shaft and thereby ensures that the control shaft remains in the illustrated position.

Figure 3:
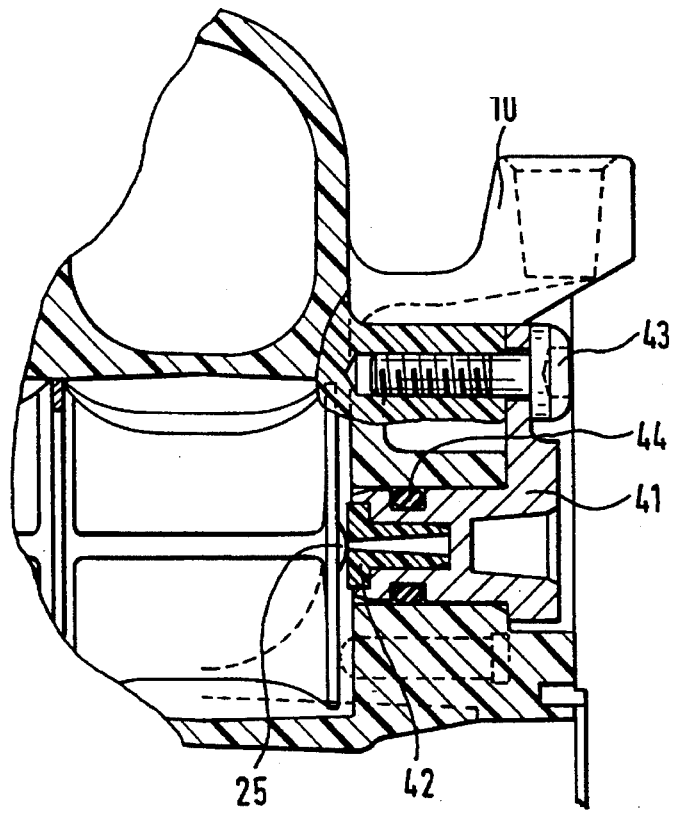
FIG. 3 is a representation of a detail of an axial bearing.

FIG. 3 is a detail illustration of the right-side support of the control shaft on the plastic component 10. As illustrated in FIG. 2, the control shaft carries a nub 25 arranged in the center. A supporting element 41 is arranged on the plastic component 10. A bearing plate 42 is situated in this supporting element 41. This bearing plate may be formed, for example, of polytetrafluoroethylene (PTFE) so that, in conjunction with the plastic control shaft, an axial bearing is provided which has a very low coefficient of friction. The supporting element 41 is attached to the plastic component 10 by a screwed connection via screws 43. The supporting element 41 is provided with a sealing element 44 which prevents leakage air from entering the intake part of the engine.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake assembly for a multi-cylinder internal combustion engine, said assembly comprising at least first and second intake ducts of different lengths for each cylinder which proceed from an intake distributor and converge shortly before an intake valve, wherein a shorter of said first and second intake ducts is provided with a shut-off device comprising a control shaft, the shorter intake ducts for each cylinder being arranged laterally adjacent each other, and wherein the control shaft has at least one end mounted in a radially freely movable manner and extends entirely across the laterally adjacent shorter intake ducts.

2. An intake assembly according to claim 1, wherein at least one end of the control shaft is provided with a bearing which defines an axial position for the control shaft.

3. An intake assembly according to claim 2, wherein said axial position defining bearing is a toe bearing.

4. An intake assembly according to claim 3, wherein said toe bearing is provided with a polytetrafluoroethylene bearing plate and the control shaft is provided with a pressure spring for urging the control shaft axially against said pressure plate and resiliently holding the control shaft in the defined axial position.

5. An intake assembly according to claim 1, wherein at least one end of the control shaft is provided with a slide bearing.

6. An intake assembly according to claim 1, further comprising a radially movable claw coupling for moving the control shaft in order to adjust the shut-off device.

7. An intake assembly according to claim 1, wherein the control shaft is provided with sealing rings between openings of adjacent individual intake ducts.

8. An intake assembly according to claim 1, wherein the intake distributor and the control shaft are made of synthetic resin.

9. An intake assembly according to claim 8, wherein the intake distributor is manufactured by the molten-core method.

10. An intake assembly according to claim 8, wherein the control shaft is an injection-molded part.

* * * * *